United States Patent [19]

Tanaka

[11] Patent Number: 5,380,097
[45] Date of Patent: Jan. 10, 1995

[54] LINEAR MOTION ROLLING GUIDE UNIT WITH OPEN-CLOSE PLUGS IN THE BRANCHING OIL GROOVES

[75] Inventor: Kazuhiko Tanaka, Fuchu, Japan

[73] Assignee: Nippon Thompson Co., Ltd., Tokyo, Japan

[21] Appl. No.: 148,363

[22] Filed: Nov. 8, 1993

[30] Foreign Application Priority Data

Nov. 12, 1992 [JP] Japan .................... 4-084028

[51] Int. Cl.$^6$ .................... F16C 33/10; F16C 29/06
[52] U.S. Cl. .................... 384/13; 384/44; 384/45
[58] Field of Search .................... 384/13, 43, 44, 45

[56] References Cited

U.S. PATENT DOCUMENTS

| | | | |
|---|---|---|---|
| 4,582,369 | 4/1986 | Itoh | 384/13 |
| 4,850,720 | 7/1989 | Osawa | 384/13 |
| 5,129,736 | 7/1992 | Tanaka | 384/45 |
| 5,139,347 | 8/1992 | Hattori | 384/45 X |
| 5,265,963 | 11/1993 | Kawaguchi | 384/45 X |

Primary Examiner—Thomas R. Hannon
Attorney, Agent, or Firm—Browdy and Neimark

[57] ABSTRACT

A lubricating device for a linear motion rolling guide unit which ensures smooth supply of lubricating oil to the upper and lower raceways when the track rail is laid on an inclined or vertical surface of a base. A slider mounted astride the track rail has a casing slidable relative to the track rail and end caps attached to the longitudinal ends of the casing. The end caps are each formed with oil passages, branch oil passages and communication oil passages to supply lubricating oil to the raceways on both sides between the track rail and the casing. Open-close plugs are installed in the branch oil passages. The track rail is formed with communication through-holes that allow the raceways on both sides to communicate with each other. The lubricating oil, after lubricating the upper raceways, flows down the communication through-holes to lubricate the lower raceways.

5 Claims, 5 Drawing Sheets

LINEAR MOTION ROLLING GUIDE UNIT WITH OPEN-CLOSE PLUGS IN THE BRANCHING OIL GROOVES

BACKGROUND OF THE INVENTION

1. Field of the Invention

The present invention relates to a linear motion rolling guide unit suitably applied for machine tools, industrial robots, precision processing equipment and testing equipment, in which sliders slide on track rails with a number of rolling elements interposed therebetween.

2. Description of the Prior Art

Linear motion rolling guide units generally have sliders mounted astride track rails with a large number of rolling elements interposed therebetween so that the sliders can slide on the track rails. Such linear motion rolling guide units are available in a variety of types. As an example of such a linear motion rolling guide unit, a four-raceway endless linear motion rolling guide unit will be explained by referring to FIG. 6 to FIG. 9.

Figure 6:
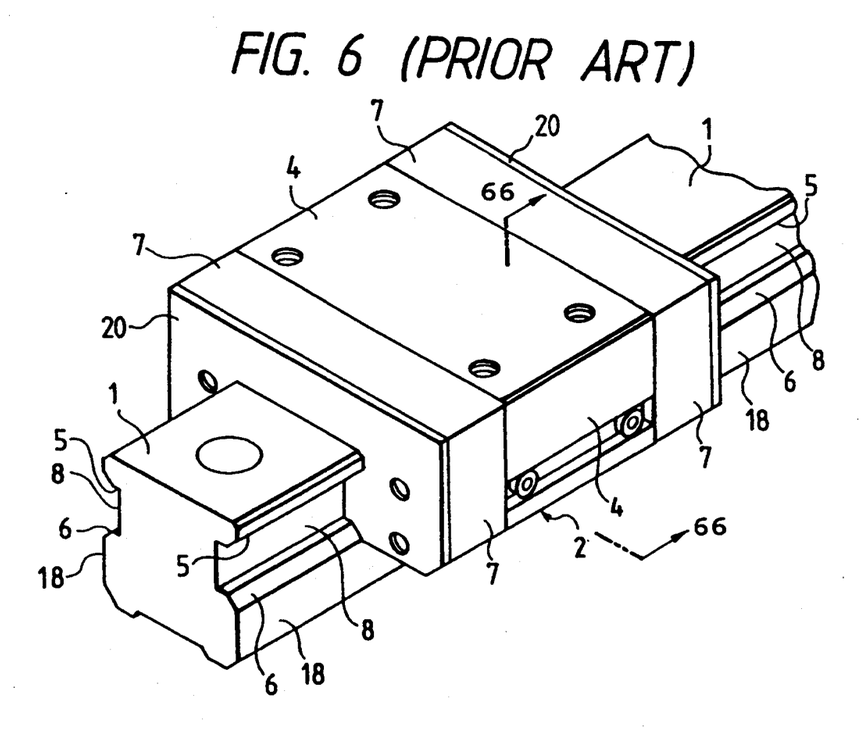
FIG. 6 is a perspective view of a four-raceway endless linear motion rolling guide unit.
Figure 7:
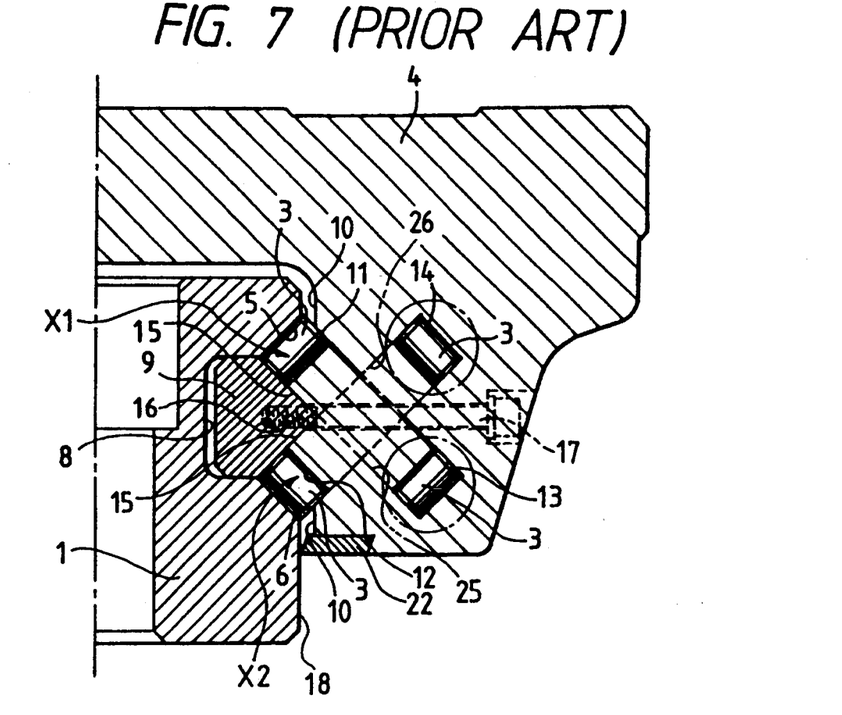
FIG. 7 is a fragmentary cross section taken along the line A—A of FIG. 6.

The four-raceway endless linear motion rolling guide unit has a track rail 1 with a substantially I-shaped cross section, a slider 2 straddling the track rail 1 in such a way that it can move relative to or slide on the track rail 1, and a number of cylindrical rolls 3 rotatably interposed between the track rail 1 and the slider 2. The track rail 1 is formed with recessed grooves 8 extending longitudinally on both sides 18 thereof, which fort raceway surfaces 5, 6. The recessed grooves 8 of the track rail 1 are formed at the upper and lower edges thereof with longitudinally extending, inclined upper and lower raceway surfaces 5, 6 respectively. The slider 2 has a casing 4 which is formed with a recessed portion 10 so that the casing can straddle the track rail 1, and end caps 7 attached to both longitudinal ends of the casing 4. To seal the boundary between the track rail 1 and the slider 2 when the slider 2 slides on the track rail 1, the ends of the end caps 7 are each provided with an end seal 20 and the underside of the slider 2 with an under seal 22.

The recessed portion 10 of the casing 4 is formed with a longitudinally extending upper raceway surface 11 and a lower raceway surface 12 at locations facing the upper raceway surface 5 and the lower raceway surface 6 of the track rail 1. Between the upper raceway surface 11 and the lower raceway surface 12 of the casing 4 is formed an engagement groove 15, which receives an engagement projection 16 formed on the retainer 9. The retainer 9 has one part thereof loosely fitted in the recessed groove 8 of the track rail 1 and is fixed to the casing 4 by bolts 17.

In the above construction of the U-raceway endless linear motion rolling guide unit, two raceways X1, X2 are formed on each side of the track rail 1, one between the upper raceway surface 5 on the track rail 1 and the upper raceway surface 11 on the casing and the other between the lower raceway surface 6 on the track rail 1 and the lower raceway surface 12 on the casing 4. Hence, a total of four raceways are formed on both sides of the track rail 1. In these roller raceways, a number of cylindrical rollers 3 roll in contact with the facing raceway surfaces 5, 11/6, 12. The casing 4 is formed with return passages 13, 14, and the end caps 7 are formed with direction changing passages 25, 26 that connect the roller raceways and the return passages 13, 14.

Figure 10:
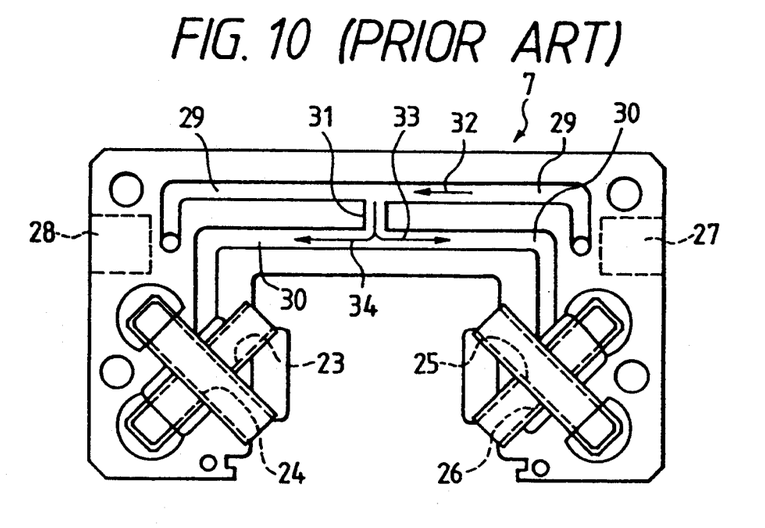
FIG. 10 is an end view of the end cap of the conventional linear motion rolling guide unit, as seen from the casing side.

These direction changing passages are explained by referring to FIG. 10. The end surfaces of the end caps 7 are formed with two direction changing passages 23, 24/25, 26 on each side of the track rail 1 that cross each other without interference. Thus, as the slider 2 slides on the track rail 1, a number of cylindrical rollers 3 trapped between, for example, the facing raceway surfaces 5 and 11 are led into the direction changing passage 23 and then into the return passage 13, circulating in an endless circulation path. Likewise, a number of cylindrical rollers 3 trapped between the facing raceway surfaces 6 and 12 move into the direcrtion changing passage 24 and into the return passage 14, circulating in an endless circulation path. The same applies to the direction changing passages 25, 26 and their explanation is omitted.

Figure 9:
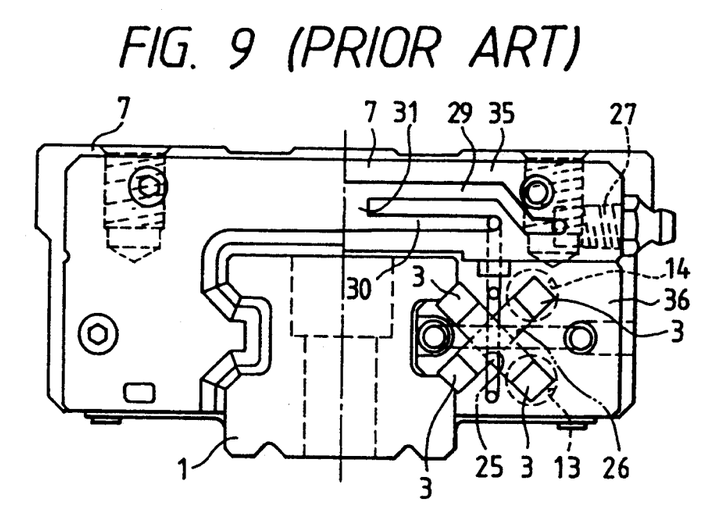
FIG. 9 is an end view of the end cap in the four-raceway endless linear motion rolling guide unit of FIG. 6.

The end cap 7 is provided with an end seal 20 that seals the gap between the track rail 1 and the slider 2, and is formed with oil supply ports 27, 28 and oil grooves for feeding lubricating oil to the raceways X1, X2 between the raceway surfaces 5 and 11/6 and 12 on the track rail 1 and the slider 2. The oil supply ports 27, 28 are provided on each side of the end cap 7 so that lubricating oil can be supplied from either side.

The oil groove comprises: a oil passage 29 that extends from the oil supply ports 27, 28 on the left and right side toward the center of the end cap 7; a branch oil passage 30 that supplies lubricating oil to the raceway surfaces 5, 6 formed on the side wall surface 18 of the track rail 1; and a communicating oil passage 31 that connects the oil passage 29 and the branch oil passage 30. The communication oil passage 31 is located on the center line of the end cap 7. The lubricating oil supplied from one oil supply port 27 passes, as indicated by arrows 32, 33, 34, through the oil passage 29 formed in the end cap 7, branches at the communicating oil passage 31 and from there flows through the branch oil passage 30 to the raceways X1, X2 on the left and right side of the track rail.

Described above is the construction of the conventional 4-raceway endless linear motion rolling guide unit, with the slider 2 normally placed on a horizontal surface for sliding. That is, the oil passage 29 and the branch oil passage 30 are kept horizontal during use, as shown in FIG. 10. As application of the linear motion rolling guide unit widens, a need arises to use the linear motion rolling guide unit in a vertical position or in an inclined position.

When the conventional linear motion rolling guide unit with the above-mentioned oil passages is laid laterally or horizontally on a vertical surface of a base, such as sidewall, or on an inclined surface, a problem arises that the lubricating oil will flow downwardly lubricating only the rolling elements situated at lower side, leaving the rolling elements at upper side unlubricated.

When the conventional linear motion rolling guide unit is used in a vertical or inclined state, for example, with the right side tilted downward or rotated 90 degrees, the lubricating oil will pass through the oil passage 29 into the communication oil passage 31 and then into the branch oil passages 30. Because of the influence of gravity, the lubricating oil will flow mainly in the direction of arrow 33 so that the oil flow in the direction of arrow 34 will be small or none. That is, of the raceways on both sides of the track rail 1, those situated on the upper side will be fed with only an insufficient amount of lubricating oil or not at all. In other words, the raceways are lubricated only on one side of the track rail. Because the raceways constitute a part of the unit that bears heavy load, it is an important matter to prevent the one-side lubrication, i.e. supply lubricating oil to the raceways equally on both sides.

SUMMARY OF THE INVENTION

A major objective of this invention is to solve the above problems and to provide a lubricating device for a linear motion rolling guide unit, which prevents imbalance in the supply of lubricating oil between the raceways on the upper side and those on the lower side when the linear motion rolling guide unit is used in other than a horizontal condition, such as in an inclined state, in order to assure good lubrication of the raceways located between the track rail and the slider.

It is a further object of this invention to provide a linear motion rolling guide unit, which comprises:
- a track rail having raceway surfaces formed on longitudinally extending sidewall surfaces thereof; and
- a slider including: a casing mounted astride and slidable relative to the track rail and having raceway surfaces on both sides thereof at positions facing the raceway surfaces of the track rail; the end caps attached to longitudinal ends of the casing; and a number of rolling elements circulating through raceways defined between the opposing raceway surfaces.

More specifically, it is an object of this invention to provide a lubricating device for a linear motion rolling guide unit;
in which the raceway surfaces on both sides of the track rail and the casing are arranged inclined or vertical;
in which the track rail is formed with communication through-holes that allow the raceway surfaces on both sides to communicate with each other;
in which the end caps are formed at the side portions thereof with oil supply ports for introducing lubricating oil;
in which the end caps are also formed with: oil passages extending from the oil supply ports toward the center of the end caps; and branch oil passages branching from the oil passages and communicating with the raceway surfaces on both sides of the track rail; and
in which open-close means are provided in each of the branch oil passages.

In this lubricating device for a linear motion rolling guide unit, the open-close means comprise plug holes formed in the end caps and plugs to be fitted in the plug holes to close the branch oil passages, or the open-close means are formed by open-close valves arranged in the end caps. With the slider set on the track rail whose raceway surfaces on both sides are vertically spaced apart, the open-close means on the lower side is closed and that on the upper side open.

Since the open-close means are provided in the branch oil passages formed in the end caps, it is possible to close the open-close means installed in the downwardly extending branch oil passage and open the open-close means installed in the upwardly extending branch oil passage. Then, the lubricating oil supplied from the oil supply ports passes through the branch oil passages upwardly extending from the oil passage to lubricate the raceways on the upper side. The lubricating oil then flows down the communication through-holes to lubricate the raceways on the lower side. Hence, when the linear motion rolling guide unit is used in an inclined or vertical condition, the upper and lower raceways can be lubricated effectively. The communication through-holes may be formed in one or both ends of the track rail, or formed anywhere along the length of the track rail as appropriate. Furthermore, this linear motion rolling guide unit can be obtained simply by making some modifications to the existing units, i.e. by providing the open-close means in the oil passages and forming the communication through-holes in the track rail for allowing the raceways on both sides to communicate with each other.

Further, even when the linear motion rolling guide unit is used in other than a horizontal condition, such as in a vertical or an inclined state, the lubricating oil can be fed to the raceway surfaces on the upper side by closing the open-close means on the lower side. Hence, the lubricating oil, after lubricating the raceway surfaces on the upper side, flows down the communication through-hole in the track rail to lubricate the raceway surfaces on the lower side, thus completely eliminating the conventional problem that only the lower-side raceways are supplied with lubricating oil and therefore drawbacks associated with such one-side lubrication. Moreover, this linear motion rolling guide unit can be used under various conditions of use by performing simple operations of opening and closing the open-close means on the part of the user.

In addition, this linear motion rolling guide unit can be constructed so as to feed the lubricating oil to individual raceways independently of each other. In this construction, forming the open-close means by an open-close valve makes it possible to force the lubricating oil to flow to whichever raceway is on the upper side by switching the valve appropriately when the unit is used in an inclined or vertical state. The lubricating oil that has lubricated the upper-side raceways is also fed to the lower-side raceways by gravity for lubrication. Therefore, this linear motion rolling guide unit can be applied to many conditions of use.

In this way, the linear motion rolling guide unit of this invention can be used in other than a horizontal state, for example in a vertical or inclined state, further widening the range of applications.

DETAILED DESCRIPTION OF THE EMBODIMENT

Figure 1:
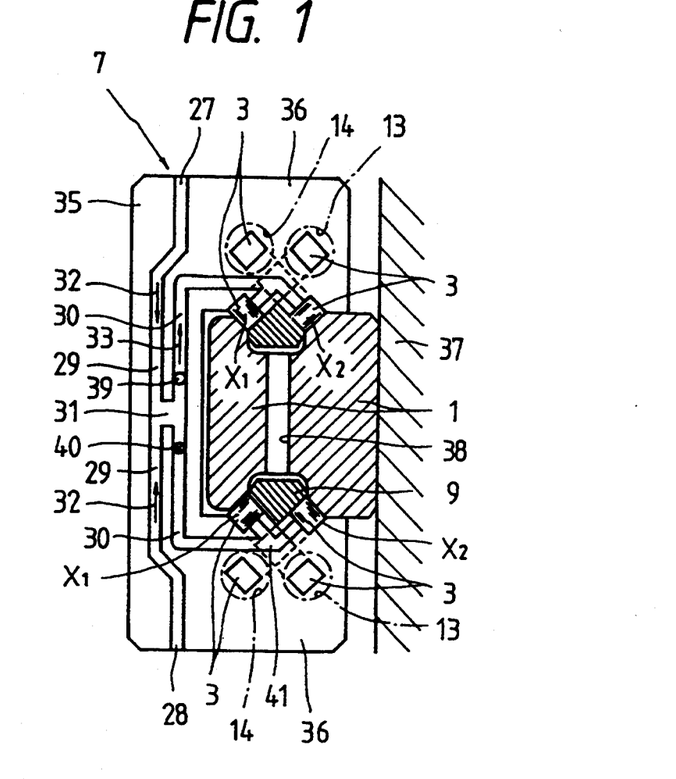
FIG. 1 is an end view of the end cap of a four-raceway endless linear motion rolling guide unit mounted on a track rail, showing one embodiment of a lubricating device for the linear motion rolling guide unit according to this invention.
Figure 2:
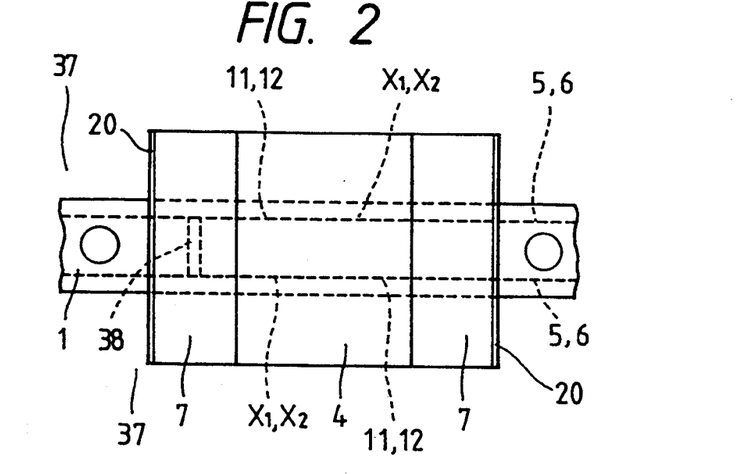
FIG. 2 is a plan view of the linear motion rolling guide unit of FIG. 1 mounted on the track rail laid on a sidewall base.

By referring to FIG. 1 and FIG. 2, one embodiment of a lubricating device in the linear motion rolling guide unit according to this invention will be described. While the lubricating device may be applied to various kinds of linear motion rolling guide units, the embodiment presented here concerns a case where it is applied to the conventional four-raceway endless linear motion rolling guide unit of FIG. 6 to FIG. 10. The linear motion rolling guile unit, when applied to the conventional four-raceway endless linear motion rolling guide unit, has the similar construction to that shown in FIG. 6 to FIG. 10, except that an open-close means is provided in a lubricating oil passage in the end cap 7 and that a communication through-hole is provided in the track rail. Thus, similar components are given like reference numbers.

The linear motion rolling guide unit comprises: a track rail 1 having raceway surfaces 5, 6 formed on both longitudinally extending sidewall surfaces 18; and a slider 2 which consists of a casing 4 slidably mounted astride the track rail 1 and having raceway surfaces 11, 12 formed at positions facing the raceway surfaces 5, 6, end caps 7 attached to the longitudinal ends of the casing 4, and a number of rolling elements or cylindrical rolls 3 circulating through raceways X1, X2 between the raceway surfaces 5 and 11, 6 and 12. This linear motion rolling guide unit is particularly suited for applications where the raceway surfaces 5, 6 of the track rail 1 are vertically spaced apart from each other, as when the track rail is laid horizontally on an inclined or vertical surface. In FIG. 1, the unit is shown secured to a base 37 so that the raceway surfaces 5, 6 of the track rail 1 are in upper and lower positions, vertically spaced apart. In this linear motion rolling guide unit, the track rail 1 is formed with a communication through-hole 38 that allows the raceways 5, 6 on one side to communicate with those on the other. The end cap 7 is formed with oil passages 29 that extend from oil supply ports 27, 28 formed in oil introducing side portions (in FIG. 1, at the top and bottom portions)-toward the center. The end cap 7 is also formed with branch oil passages 30 that branch from the oil passages 29 and communicate with the raceways X1, X2 on both sides. In each of the branch oil passages 30 there are provided open-close means 39, 40.

These open-close means 39, 40 each comprise a plug hole formed in the end cap 7 and a plug engageable in the plug hole to close the branch oil passage 39. The open-close means 39, 40 may be formed by a flow regulating valve, such as a flow control valve or a sluice valve, arranged in the end cap 7. With the slider 2 mounted on the track rail 1, the open-close means 39, 40 are closed on the lower side and open on the upper side.

Like the one shown in FIG. 6 and 7, the linear motion rolling guide unit of this invention has a track rail 1 and a slider 2. The track rail 1 is formed with recessed grooves 8 extending longitudinally on both side wall surfaces 18, each forming an upper raceway surface 5 and a lower raceway surface 6. The slider 2 straddles the track rail 1 in such a way that it can slide on the track rail 1. The slider includes: a casing 4 which is slidable on the track rail 1 and which has upper raceway surfaces 11 formed thereon at positions facing the upper raceway surfaces 5 and lower raceway surfaces 12 at positions facing the lower raceway surfaces 6; end caps 7 attached to the longitudinal ends of the casing 4; engagement grooves 15 formed in the casing 4 between the raceway surfaces 11 and 12; retainer plates 9 each having an engagement projection 16 fitted in the engagement groove 15; and a number of cylindrical rollers 3 as rolling elements that are trapped between the facing raceway surfaces 5 and 11/6 and 12 and movable in a circulation path.

In this linear motion rolling guide unit, the end caps 7 attached to the longitudinal ends of the casing 4 have end seals 20 fitted to the end surfaces thereof. Under seals 22 are attached to the underside of the casing 4 and the end caps 7. The end caps 7 are mounted to the both ends of the casing 4 by driving screws into threaded mounting holes. The interior side of each end cap 7 is formed, on each side, with direction changing passages 25, 26, by which a number of cylindrical rollers 3 circulating through the raceways between the casing 4 and the track rail 1 can change their directions.

Figure 8:
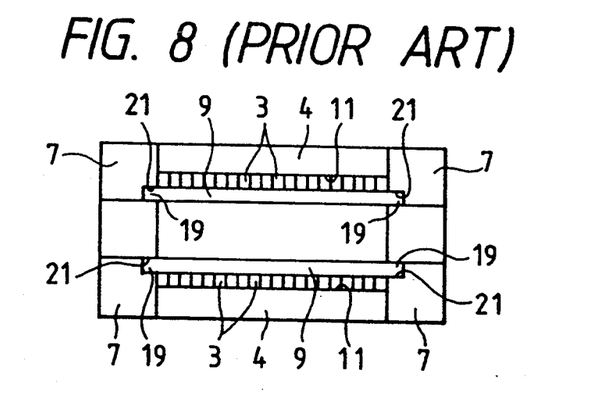
FIG. 8 is a bottom view of the four-raceway endless linear motion rolling guide unit of FIG. 6.

The linear motion rolling guide unit of this invention positions the end caps 7 with respect to the casing 4 by utilizing the retainer plates 9 secured to the casing 4 by bolts 17, as shown in FIG. 7. FIG. 8 is a bottom view of the linear motion rolling guide unit.

In this lienar motion rolling guide unit, the whole length of the retainer plate 9 is made longer than the total length of the casing 4, and the end caps 7 are formed with a positioning groove 21. In the assembly of the casing a and the end caps 7, the end caps 7 are placed in contact with the ends of the casing 4 and the ends 19 of the retainer plate 9 are fitted into the positioning grooves 21 of the end caps 7. In this condition, the end caps 7 are secured to the casing 4. The engagement grooves 15 formed in the casing 4 are cut in a V shape at the same time that the raceway surfaces 11, 12 are formed. The engagement projection 16 of the retainer plate 9 is fitted into the V-shaped groove in the casing 4 and the retainer plate 9 is fixed to the casing 4 by bolts 17.

Because the retainer plate 9 is positioned correctly with respect to the casing 4 and secured to the V-shaped groove in the casing 4, which is cut simultaneously with the raceway surfaces 11, 12, and because the end caps 7 are positioned with respect to the retainer plate 9, it is possible to correctly position the end caps 7 with respect to the casing 4. This in turn makes it possible to construct with precision the endless circulation path, which consists of the loaded raceway formed by the track rail 1 and the casing 4, the direction changing passages formed in the end caps 7, and the return passages 13, 14 formed in the casing 4. As a result, the cylindrical rollers 3 can be rotated and moved smoothly through the endless circulation path and the gap between the track rail 1 and the slider 2 can be sealed in good condition.

Figure 4:
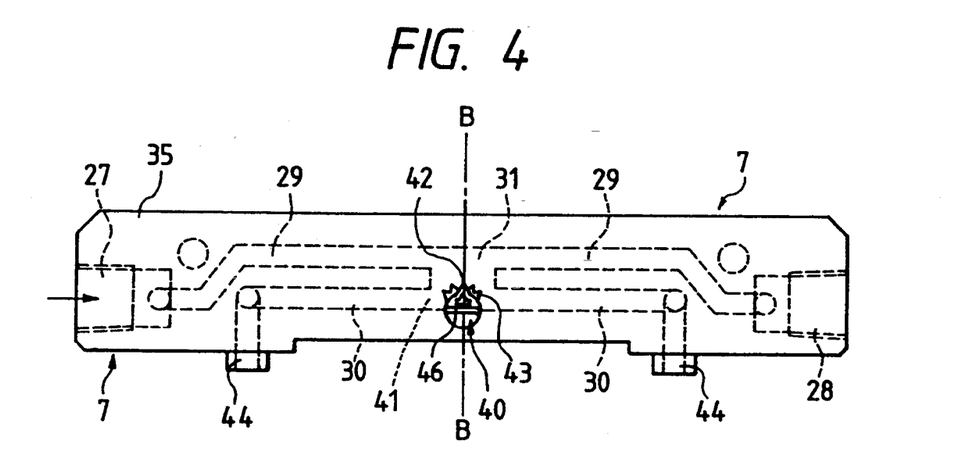
FIG. 4 is an end view of the end cap of FIG. 3 as seen from the end seal side.

FIG. 9 is an end view of the end cap 7. As shown in FIG. 4, the end cap 7 is shaped like a gate and consists of an upper portion 35 located above the track rail 1 and a pair of side portions 36 facing the side wall surfaces 18 of the track rail 1. The side portions 36 of the end cap V are each provided with the direction changing passages. The construction of the side portions 36 is the same as explained and shown in FIG. 9 and thus their explanation is not given here.

In this linear motion rolling guide unit, the oil passage in the first member 35 of the end cap 7 includes: oil passages 29 extending laterally from the upper and lower oil supply ports 27, 28 toward the center of the end cap 7; branch oil passages 30 communicating with upper and lower second members 36 of the end cap 7; and a communication oil passage 31 allowing communication between the oil passages 29 and the branch oil passages 30. The communication oil passage 31 is provided at the center line of the end cap 7. The branch oil passages 30 change their direction on the way from the vertical direction to lateral direction. That is, the branch oil passages 30 each consist of a first passage portion extending from the communication oil passage 31 toward each side of the end cap 7 and a second passage portion extending from the first passage portion toward the raceways 11, 12 of the casing 4. The branch oil passages 30 communicate with a branch oil passages 41 in the second member 36 and extend to the raceways X1, X2. The oil supply ports 27, 28 are formed in the top and bottom surface of the end cap 7 so that lubricating oil can be supplied either from the top or bottom.

Because this linear motion rolling guide unit is constructed as described above, the lubricating oil flows as follows. That is, the lubricating oil supplied from one of the supply ports 27, 28 flows through the oil passage 29 formed in the end cap 7 and enters from the communication oil passage 31 into the branch oil passage 30. At this time, since the open-close means 39 provided in the upper branch oil passage 30 is open and the open-close means 40 in the lower branch oil passage 30 closed, the lubricating oil is fed into the upwardly extending branch oil passage 30, from which it further flows to the branch oil passage 41 in the second member 36 and into the raceways X1, X2 on the upper side. After having lubricating the raceways X1, X2 on the upper side, the lubricating oil flows down the communication throughhole 38 formed in the track rail 1 to lubricate the raceways X1, X2 on the lower side. When the linear motion rolling guide unit is used in a horizontal condition, the open-close means 39, 40 provided in each branch oil passage 30 are both opened. With both of the open-close means 39, 40 open, the lubricating oil supplied from the supply ports 27, 28 is fed in a way similar to that of the conventional unit shown in FIG. 10, so that the raceways X1, X2 on both sides are equally supplied with lubricating oil.

In this linear motion rolling guide unit, the open-close means may be formed by a flow regulating valve 42 installed at a communication portion or branch portion between the communication passage 31 and the branch oil passages 30. The flow regulating valve 42 is particularly suited for applications where the linear motion rolling guide unit is used in an inclined state. Adjusting the flow regulating valve 42 so that the cross-sectional area of the oil passage 30 connecting to the raceways X1, X2 on the lower side is smaller than that of the oil passage 30 communicating with the raceways X1, X2 on the upper side causes the amounts of lubricating oil supplied to the paired raceways X1, X2 on the upper side and those on the lower side to be equal.

Figure 5:
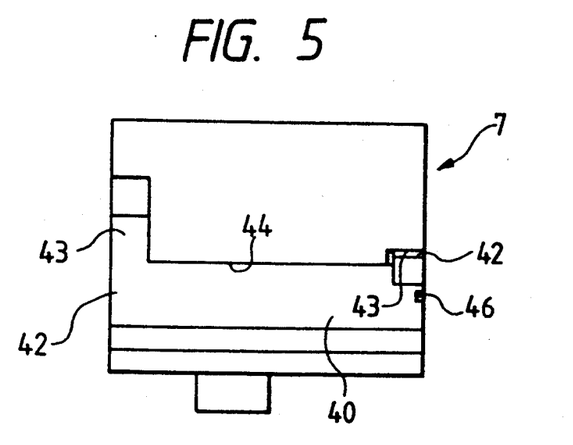
FIG. 5 is a cross section taken along the line B—B of FIG. 3 and FIG. 4.

The flow regulating valve 42 comprises: a valve disk 43 placed in the communication oil passage 31; a valve shaft 45 rotatably fitted in a shaft hole 44 in the end cap 7 and having the valve disk 43 formed integrally at one end thereof; a screwdriver slot 46 formed at the other end of the valve shaft 45; and an engagement claw 48 engageable with engagement teeth 47 formed on the circumference of the shaft hole 44. The engagement claw 48 is resilient. Inserting a screwdriver tip into the screwdriver slot 46 and rotating the valve shaft 45 causes the engagement claw 48 to engage the engagement teeth 47 securing the valve shaft 45 and the valve disk 43 at a desired angle. The flow regulating valve 42 can be adjusted in several steps.

In this linear motion rolling guide unit, the use of the flow regulating valve 42 as the open-close means allows the lubricating oil to be supplied from either side because the supply ports 27, 28 are provided on each side of the end cap 7. The lubricating oil supplied from one supply port 27 flows through the oil passage 29 in the end cap 7 and is branched by the valve disk 43 installed in the communication oil passage 31 into the branch oil passages 30, from which it flows to the paired raceways X1, X2 formed on each of the sidewall surfaces 18 of the track rail 1, as indicated by the arrows 32, 33, 34.

Figure 3:
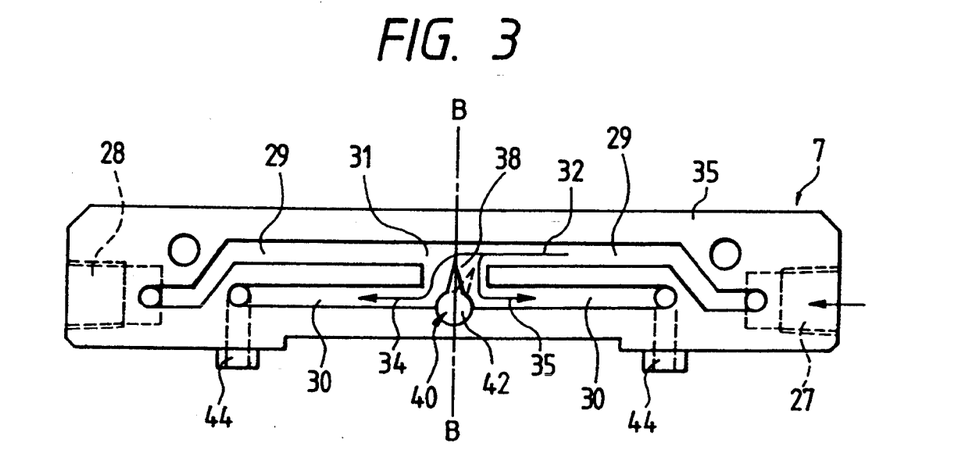
FIG. 3 is an end view of an upper portion of the end cap of FIG. 1 according to another embodiment of this invention, as seen from the casing side.

When the linear motion rolling guide unit is used in a horizontal state, the flow regulating valve 42 is adjusted until the valve disk 43 comes to a neutral position drawn in a solid line in FIG. 3. In this condition, the lubricating oil supplied form the supply port 27 passes through the oil passage 29 in the direction of arrow 32 and is evenly distributed by the valve disk 43 into the paired raceways X1, X2 on each side. When, with the valve disk 43 at the neutral position, the linear motion rolling guide unit is inclined, for example, with the right side tilted downward in FIG. 3, the gravity causes a greater amount of lubricating oil supplied from the supply port 27 to flow in the direction of arrow 34, leaving the oil flow toward the arrow 35 becoming smaller. Hence, when the linear motion rolling guide unit is used with the right side tilted down, the flow regulating valve 42 is adjusted to turn the valve disk 43 to the inclined position drawn in a broken line. With the flow regulating valve 42 adjusted in this way, the cross-sectional area of the oil passage on the right side of the valve disk 43 is smaller than that on the left side, restricting the flow of lubricating oil toward the arrow 34 while increasing the oil flow in the direction of arrow 33. Therefore, the lubricating oil is supplied to the raceways X1, X2 equally on both sides of the track rail 1, thus assuring good lubrication of the raceways.

I claim:

1. A lubricating device for a linear motion rolling guide unit comprising:

a track rail having first raceway surfaces formed on longitudinally extending sidewall surfaces thereof, the track rail being mounted to a base in such a way that the side surfaces of the track rail are disposed at vertically spaced positions;

a casing mounted astride and slidable relative to the track rail and having second raceway surfaces formed at positions facing the first raceway surfaces, the casing also having return passages formed therein;

raceways formed between the first raceway surfaces of the track rail and the second raceway surfaces of the casing;

end caps attached to the longitudinal ends of the casing and having direction changing passages formed therein;

rolling elements circulating through the raceways, the direction changing passages and the return passages;

a slider including the casing, the end caps and the rolling elements, the slider being mounted astride the track rail in such a way that the side surfaces of the slider are disposed at vertically spaced positions;

communication through-holes formed transversely through the track rail and longitudinally spaced apart from each other to allow the raceway surfaces on both sides of the track rail to communicate with each other;

oil supply ports formed in the sides of each of the end caps for introducing lubricating oil;

oil passages extending from the oil supply ports to the center of each of the end caps;

communication oil passages formed at the center of each of the end caps and communicating with the oil passages;

branch oil passages formed in the end caps and branching from the communication oil passages to communicate with the raceway surfaces on both sides of the track rail; and open-close means provided in each of the branch oil passages.

2. A lubricating device for a linear motion rolling guide unit, according to claim 1, wherein the open-close means comprise: a plug hole formed transversely through the branch oil passages in the end caps; and a plug to be fitted into the plug hole to close the branch oil passages.

3. A lubricating device for a linear motion rolling guide unit, according to claim 1, wherein when the slider is set on the track rail, which is mounted on the base so that the raceway surfaces on both sides of the track rail face each other in vertical directions, the open-close means are closed on the lower side and open on the upper side.

4. A lubricating device for a linear motion rolling guile unit, according to claim 1, wherein the oil supply ports are formed at both sides of the end caps.

5. A lubricating device for a linear motion rolling guide unit, according to claim 1, wherein the branch oil passages comprise: first passage portions extending from the communication oil passages toward both sides of the end caps; and second passage portions extending from the first passage portions to the second raceway surfaces of the casing.

* * * * *